Figure 1:
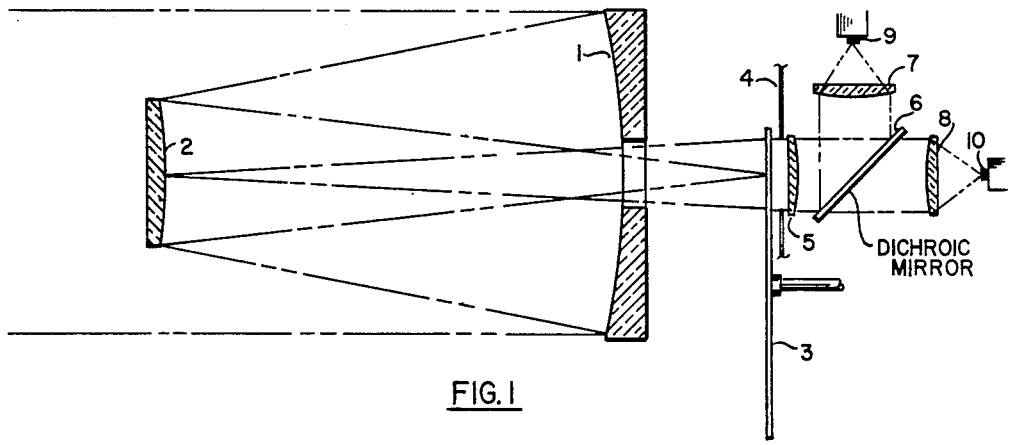

Oct. 31, 1961 M. M. MERLEN 3,007,053
INFRARED TRACKER

Filed March 21, 1960 2 Sheets-Sheet 1

INVENTOR.
MONTY M. MERLEN
BY
Robert Amor Morton
ATTORNEY

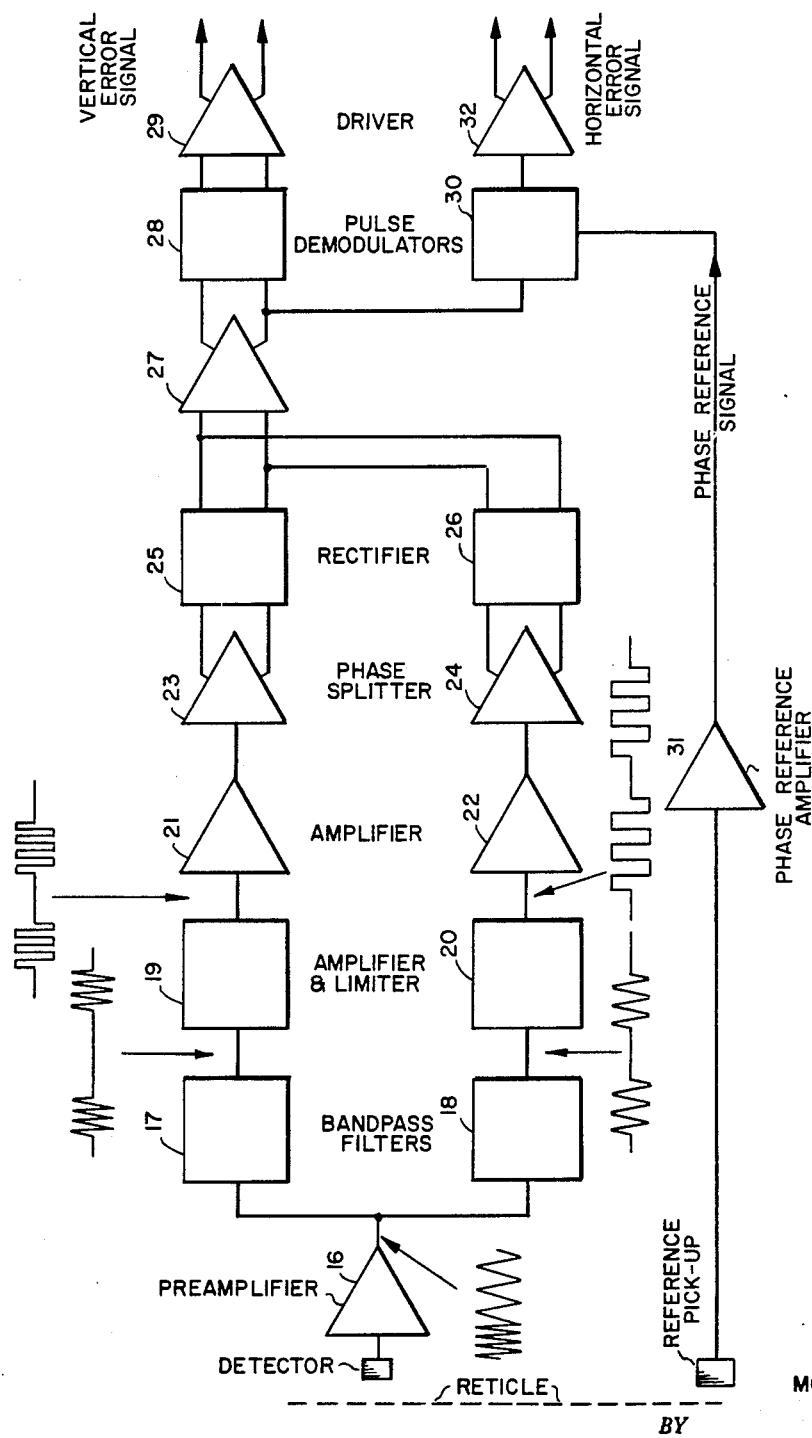

United States Patent Office 3,007,053
Patented Oct. 31, 1961

3,007,053
INFRARED TRACKER
Monty M. Merlen, Stamford, Conn., assignor to Barnes Engineering Company, Stamford, Conn., a corporation of Delaware
Filed Mar. 21, 1960, Ser. No. 16,290
7 Claims. (Cl. 250—203)

This invention relates to a tracker for moving objects and more particularly to trackers utilizing infrared radiations.

The problem of tracking a rapidly moving object such as an airplane, rocket or other missile presents a serious problem under conditions when radar tracking is difficult or unreliable due to proximity of the ground or other disturbing influences. Under such conditions trackers using infrared radiation present many important advantages. Essentially a tracker consists of aimable optics for the radiations in question, suitable detectors and reticles for producing error signals when the object to be tracked is not centered vertically or horizontally and indicators or servo mechanisms which permit or cause the aiming of the optics to remain locked on the target. It is with the first two elements that the present invention deals.

A very effective infrared tracker is described and claimed in the copending application of Robert W. Astheimer and Monty M. Merlen, Serial No. 848,296 filed October 23, 1959 now Patent No. 2,961,545, Nov. 22, 1960. This tracker uses four sets of optics or telescopes rigidly connected together, four detectors, four aperture masks and a moving reticle. Each of the telescopes, masks and detectors perform a single function. Two of them provide a coarse acquisition of the target, vertically and horizontally, the other two generate fine proportional tracking error signal also vertically and horizontally. The coarse acquisition depends on frequency as the reticle is provided with two sets of bars or alternate opaque and transparent sections arranged in the form of spokes. The width of the spokes changes along a predetermined circle having one width nearer the center of the reticle and another further out peripherally. The numbers of bars are preferably multiples. The coarse acquisition is determined by the frequency of the signal produced from the interrupted infrared beam. This error signal is fed into suitable conventional servo mechanisms which reaim the optics to bring the target onto the centering circle.

The other two telescopes and detectors operate on a portion of the reticle where the bars are of uniform width and position is determined by phase difference between the signal produced and a fixed phase generator also actuated by the reticle. Fine tracking is a proportional signal and permits accurate tracking since the error signal is proportional and the motion of the servo elements is slowed down as centering of the target image is approached thus minimizing any tendency to hunt.

The tracker described briefly above operates with precision and reliability and is highly sensitive. When the aperture and masks are provided with saw tooth edges in accordance with the invention described and claimed in my copending application, Serial No. 78,772, filed December 27, 1960, which is, in part, a continuation of my co-pending application Serial No. 862,397, filed December 28, 1959, now abandoned, they also permit a high discrimination against uniform backgrounds and even against relatively large nonuniform objects such as large clouds and the like. In spite of the excellent performance of the tracker described it leaves something to be desired. Four separate sets of optics are needed which increases the cost and the weight to be aimed and requires accurate parallelism of the telescopes.

The present invention constitutes an improvement which, while it does not perform the tracking function any better than the earlier tracker described above, perform a substantially similar function with fewer elements and at lower cost. In particular the optical elements are reduced to one telescope with a single detector. It will be pointed out below that there may be more than one detector but they are not performing a single combined function and the device can use a single detector to perform the same tracking function that required four before.

Essentially the present invention does not differ in radiation collecting optics from other trackers. In fact it is an advantage that conventional radiometer optics may be used. The new function involves a new and improved reticle and the necessary electronic circuits to handle the output signal. While certain types of electronic circuits are necessary to the invention their detailed design is not and they will, therefore, be shown below in the drawings in block diagram form. The possibility of using straight forward electronics is a further advantage of the invention.

Essentially the device images the target on one or more detectors and vertical and horizontal departures from the predetermined center position produce error signals in the form of pulse width modulation and pulse position or phase respectively. These different components are separated from the composite signal of the detector by the electronic circuits as will be described and produce error signals which may be used in any desired manner. Since the utilization of the error signals is by conventional means they are not shown and the particular use made of them forms no part of the present invention.

Figure 2:
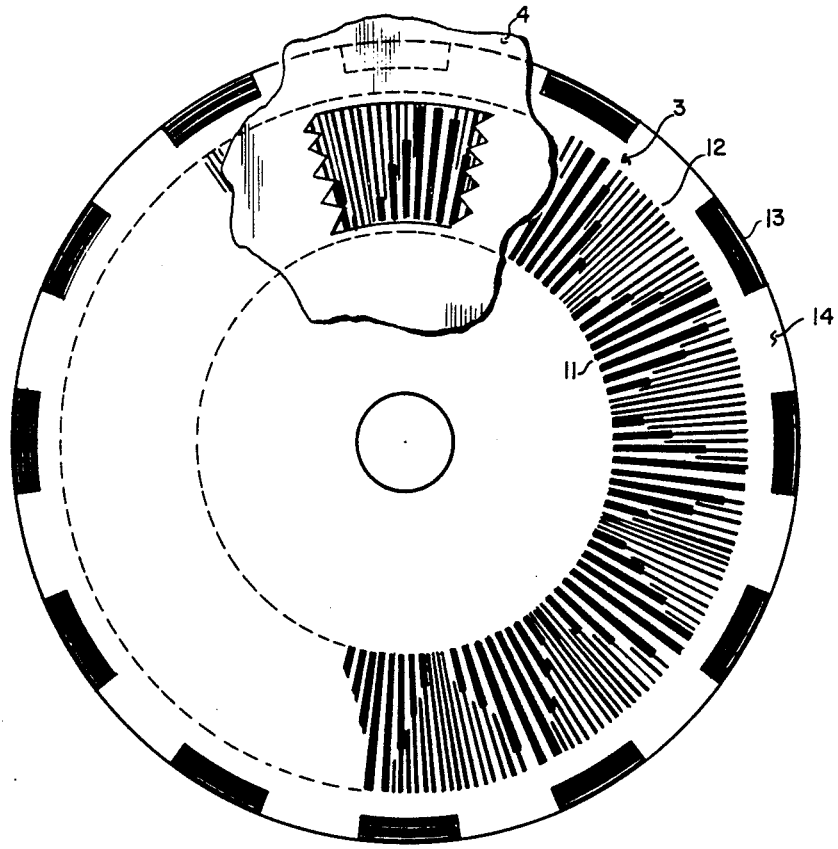

The invention will be described in greater detail in conjunction with the drawings in which:

FIG. 1 is a cross section through optics and detectors;
FIG. 2 is a plan view of a reticle, and
FIG. 3 is a block diagram of the electronic circuits.

FIG. 1 shows a conventional Cassegrain telescope as a radiation collecting device. As usual the telescope comprises a primary mirror 1 and a secondary mirror 2 the latter imaging collimated light on the plane of a reticle 3. The reticle is associated with a field or aperture mask 4 and the radiations pass through a field lens 5, a dichroic mirror 6, lenses 7 and 8 onto detectors 9 and 10. Two independent detectors are shown, not because the instrument requires two detectors, but because it permits the simultaneous use of different detectors for different wavelength ranges. The lenses, of course, must be suitable for the wavelengths to be passed. The lens 5 can be of synthetic sapphire and the lenses 7 and 8 may be of arsenic trisulfide or quartz. The two detectors 9 and 10 are shown as photoconductors, for example, a lead sulfide and a lead telluride detector, which can be refrigerated if added sensitivity is needed. The particular nature of the detectors forms no part of the present invention and, where desired, detectors for the longer wave infrared such as themistor bolometers may be used. In such a case, of course, the lenses must be of suitable material, for example, germanium.

FIG. 2 shows the reticle with the aperture of the field mask 4 shown in dotted lines. It will be seen that the latter has saw tooth edges in order to discriminate against uniform backgrounds. As has been pointed out above the mask aperture edges form the subject matter of my copending application above referred to and are not claimed herein although, of course, their valuable function is utilized.

The reticle is formed of triangles composed of bars of different spacing. Thus there are a series of triangles 11 with their bases toward the center of the reticle with wider bars and triangles 12 of narrower bars, half as wide, with their apices pointing toward the center of the reticle. In addition, on the outer periphery there are a series of uniformly spaced opaque portions 13 and transparent portions 14. These serve to produce a reference signal at 15 which is produced by conventional means (not shown). It will be seen that the center of the mask aperture is on the circle going through the centers of the triangles. If a target is centered horizontally but toward the reticle periphery vertically a series of bursts of different frequencies are produced with the higher frequency pulses longer in duration than the lower frequency pulses. If the target image is nearer the center of the reticle the reverse is true.

If the target image is off center both vertically and horizontally the detector outputs will have different pulse widths at the different frequencies and each burst will have a different phase with respect to the reference phase generated at the outer periphery of the reticle.

The number of bars in each triangle may be varied from reticle to reticle but they should be multiples in any one reticle. In the extreme one set of triangles can be solid opaque and the other set transparent. There will then be produced pulses of a single frequency but of opposite phase depending on the vertical location of the target image. The widths of these different pulses will vary and constitute the vertical error signal just as the pulse width at the higher frequencies described above where the triangles are formed of bars. In either case one error signal is determined by pulse width and the other by pulse phase.

The location of the reference generating signal at the periphery of the reticle is in no sense necessary and the reference generators may be located on any suitable circle on the reticle, for example, they may be nearer the center than the triangles on which the image of the target falls.

FIG. 3 illustrates diagrammatically the electronic processing. It shows the reticle in dash lines and a reference pickup 15 actuated by light passing through the reference elements 13 and 14 at the periphery. The electronics are shown for one detector only but are simply duplicated for the other detector or can be switched from detector to detector. The output from the detector is at two frequencies with the width of pulses of the frequencies equal for a vertically centered image and unequal for a target image which is not centered vertically. A preamplifier 16 amplifies both frequencies which then pass through two bandpass filters 17 and 18, the former passing frequencies around 1,000 cycles and the latter around 500 cycles. These frequencies are then amplified and clipped by limiting amplifiers 19 and 20 respectively. The form of waves is shown at the sides of the different circuits.

It will be noted that, after limiting, the two frequencies are in the form of square waves of constant amplitude but the width of the high and low frequency pulse bursts are not the same. In FIG. 3 there is shown the situation where the low frequency pulse is wider than the high frequency pulse and would correspond to a target image which is nearer the center of the reticle. The limited and clipped waves are then amplified and rectified in the amplifiers, phase splitters and rectifiers 21, 22, 23, 24, 25 and 26 respectively. They are then combined and amplified by the amplifier 27 and pulse width demodulator 28. This puts out an error signal proportionate to relative pulse widths of the two pulses which is amplified in the amplifier 29 and constitutes a vertical error signal.

A portion of the output from the amplifier 27 is passed into a phase detector 30 which acts as a pulse position demodulator. This detector receives reference pickup signal amplified by the amplifier 31. An output is produced which is proportional to phase difference and after amplification in the amplifier 32 constitutes a horizontal error signal.

It will be readily apparent that if the mask aperture is moved 90° on the reticle the error signals will be interchanged and the pulse width will then be a horizontal error signal and the pulse position or phase a vertical error signal. It is a matter of complete indifference as far as the operation of the present invention is concerned which orientation is used.

When the frequency is pushed to the extreme, that is where one set of triangles is solid opaque and the other solid transparent, the frequency of both signals will be the same, but 180° out of phase. In this case the amplifiers 17 and 18 and the electronic circuits following them will both be tuned to the same frequency but the signals carried by them will have a phase difference of 180°. The pulse width error signal is produced in substantially the same manner. The pulse phase or position circuitry is not changed at all and operates in the same manner. The modification of reticle shown in FIG. 2 is preferred as the higher and separate pulse frequencies permit discrimination against large spurious targets. This is merely a matter of convenience as both types of reticles give the same accurate tracking, the signal being a proportional one which avoids hunting.

Where two detectors are used as shown in FIG. 1 one set can be switched in for operation in one wavelength band and the other in the other, or both can be used simultaneously. When only a single wavelength band is of interest a single detector can be used and the dichroic mirror and extra lenses eliminated. This may result in increasing the sensitivity as some of the radiant energy is lost by the use of the dichroic mirror.

The invention has been described in conjunction with infrared radiations. It is not necessarily limited thereto and can be used with shorter wavelength radiations. When visible light is employed it permits the use of extremely sensitive radiation detectors. There is, however, some limitation on the utility of visible light instruments which normally are less usable in bright daylight. Infrared instruments are useful day or night. The term "optical radiations" will be used to cover any radiations whether infrared, visible, ultraviolet, etc., which are short enough to obey optical laws.

As has been pointed out above the present invention utilizes conventional optics as far as the telescope is concerned and the typical Cassegrain telescope used in so many infrared radiometers has been used as illustrated for the infrared. Use of such catoptric optics presents real advantages from the standpoint of cost, sensitivity and achromaticity. However, the invention operates in exactly the same manner regardless of the nature of the radiation collecting optics which can be dioptric if desired or mixed catoptric dioptric.

1. A tracker comprising in combination and optical alignment, a rotatable reticle and associated aperture mask, said aperture being located between the center and the periphery of the reticle means for collecting optical radiations from a predetermined field of view and imaging them on the plane of the reticle in the aperture mask, the reticle in the zone occupied by the aperture mask being provided with triangles of at least one interrupting bar arranged with one set of triangles having apices directed toward the center of the reticle and a second set with apices directed toward the periphery, the width of the triangle bars being the same, the bars being symmetrically arranged on either side of a line from the apex of the triangle to the center of the base means for rotating the reticle at a predetermined speed whereby the triangles chop radiation in pulses, the respective pulse widths depending on the peripheral location of the target image at the aperture, a reference signal generator generating a signal in synchronism with the reticle, a detector receiving the chopped light beam after passing through the reticle and electronic circuits, one of which produces an error signal proportional to pulse width and one proportional to pulse position or phase with respect to the reference signal.

2. A tracker according to claim 1 in which the triangles on the reticle are formed of alternating opaque and transparent bars the bar widths in the two sets of triangles being multiples whereby the pulses produced in the detector output are comprised of different frequencies.

3. A tracker according to claim 2 in which the detector is an infrared detector.

4. A tracker according to claim 3 in which the infared detector is a photoconductor sensitive to the near infrared region.

5. A tracker according to claim 1 in which the detector is an infrared detector.

6. A tracker according to claim 5 in which the infrared detector is a photoconductor sensitive to the near infrared.

7. A tracker according to claim 1 in which the bars of the triangles are bounded by straight lines.

References Cited in the file of this patent

UNITED STATES PATENTS

| | | |
|---|---|---|
| 2,403,983 | Koenig | July 16, 1946 |
| 2,931,912 | Macleish | Apr. 5, 1960 |